Oct. 7, 1969   E. C. CLARK ET AL   3,470,678
CYCLONE SEPARATOR FOR HIGH TEMPERATURE OPERATIONS
Filed June 20, 1967   2 Sheets-Sheet 1

E. C. CLARK
E. B. SCHUMACHER   INVENTORS

E. C. CLARK
E. B. SCHUMACHER  INVENTORS

United States Patent Office 3,470,678
Patented Oct. 7, 1969

3,470,678
CYCLONE SEPARATOR FOR HIGH
TEMPERATURE OPERATIONS
Earl C. Clark, Caldwell, and Edward B. Schumacher,
Holmdel, N.J., assignors to Esso Research and Engineering Company, a corporation of Delaware
Filed June 20, 1967, Ser. No. 647,534
Int. Cl. B04c 3/02
U.S. Cl. 55—269    3 Claims

ABSTRACT OF THE DISCLOSURE

A cyclone separator and a separator gas outlet tube which are especially useful in high temperature service are described. The cyclone head is shaped convex downwardly. The outlet tube contains four concentric tubes separated by annular spaces for coolant fluid flow.

---

Figure 1:
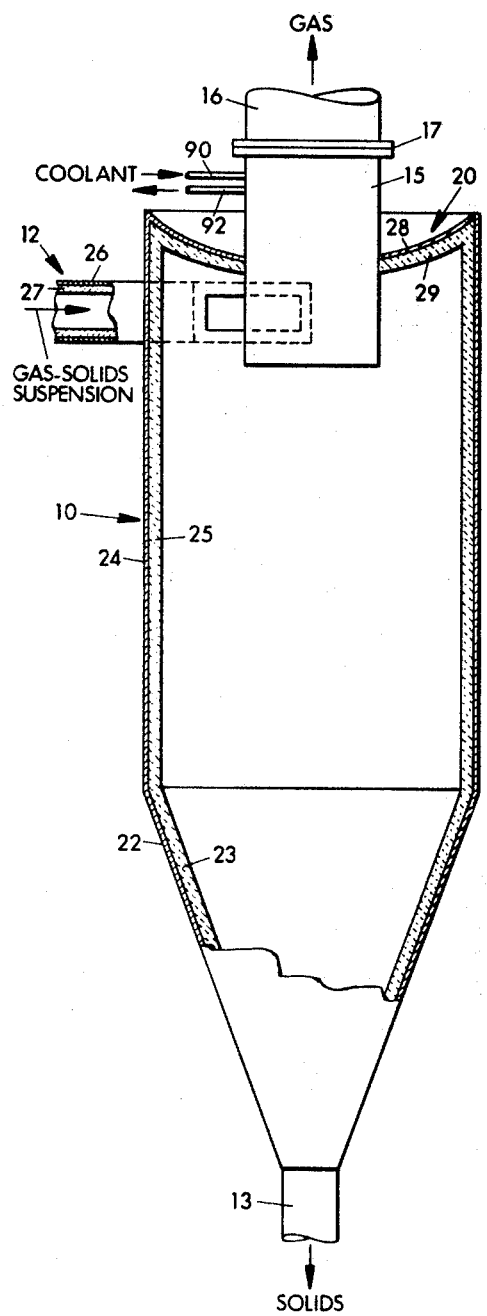

This invention relates to cyclone separators. More particularly, it relates to cyclone separators suitable for use in extremely high temperature operations.

Cyclone separators are a well known means for separating gases and solids from gas-solids suspenions. A cyclone is constructed generally of a tubular or cylindrical-shaped main body connected to a lower tapered conical portion. A tangential side inlet is provided near the top of the cylindrical main body. The cyclone also includes a top or head which is flat or, more generally, convex upwardly shaped, positioned on top of the cylindrical portion. A gas outlet tube is provided and generally extends downwardly through the cyclone top into the main body of the cyclone. The tube usually must extend down to a level slightly below the lowest portion of the inlet to assure efficient separation of solids and gases.

In operation solids-laden gases are introduced at high velocity through the tangential inlet. They follow a vortex shaped path around the outside of the gas outlet pipe downwardly towards the bottom of the separator. The solids are deposited along the walls by centrifugal force and separated from the gas. The separated gas then follows a vortex path upwardly and passes out of the top of the cyclone separator through the gas outlet tube.

While cyclones have been adapted for use in low temperature operations for many years, there has recently been developed a need for cyclones which are suitable for operations at very high temperatures, particularly temperatures above about 1800° F. and generally in the range from about 1800° F. to 3000° F.

One recently developed process which requires cyclones capable of withstanding such temperatures is the high temperature coking process.

In a high temperature coking process a fluid hydrocarbon, which may range from very light hydrocarbons such as methane or natural gas up through the petroleum naphthas and heavy residuums, is injected into a reactor containing a fluidized bed of coke particles maintained at temperatures of about 2000° F. or higher. When the hydrocarbon feed contacts the coke particles, it immediately vaporizes and cracks to liberate gaseous products consisting principally of hydrogen or very light hydrocarbons and solid coke. The solid coke is deposited on the existing coke particles enlarging them in size. Since the cracking reaction is endothermic, it is necessary to add large quantities of heat to the fluid bed. One excellent way of adding heat is to continuously withdraw coke particles from the bed by conveying them in a gas and passing them through an adjacent transfer line heater or burner in which hydrocarbons or other fuels are burned with oxygen or air in the presence of the coke particles. After the particles are heated to a temperature generally about 100° F. to 600° F. higher than the temperature in the cracking reactor, they are returned to the reactor to provide the endothermic heat for further cracking therein.

The most desirable method of conveying coke particles through the transfer line burner is by entraining them in a gas. However, before returning the heated coke particles to the fluid bed of the cracking reactor, it is then necessary to efficiently separate them from the combustion gas. This is preferably accomplished by conveying the coke-laden gases into a cyclone separator, separating the coke particles, and then passing the coke particles as a dense phase through a standpipe or dipleg from the bottom of the cyclone back into the fluid bed of the cracking reactor. The gases leave the top of the cyclone at high temperatures and may be recovered or disposed of as desired.

The coke-laden gases which are injected into the cyclone are generally at temperatures ranging from about 2200° F. to 2800° F. At these temperatures, it is necessary to provide a cyclone which is extremely durable since the coke particles themselves are extremely hard, dense and highly abrasive.

Since the hydrocarbon feed which is cracked in the cracking reactor decomposes to form large quantities of hydrogen and light hydrocarbons, there is a tendency for the evolved gases to entrain substantial quantities of the coke produced. It is therefore necessary also to provide a cyclone separator above the cracking reactor itself.

A highly sophisticated high temperature coking process is described in copending application Ser. No. 543,956 by C. N. Kimberlin, Jr., et al. Therein is described a two-stage coking process having a low temperature precracking stage and a high temperature stage. The high temperature stage is maintained preferably at temperatures ranging from about 2000 to about 2200° F. A transfer line burner is provided in association with the high temperature stage, and coke is heated in the burner to temperatures preferably from about 100° F. to 200° F. above the temperature in the high temperature cracking stage.

Conventional cyclones made entirely of metal cannot be used either for the gases from the reactor or for the still hotter gases from the transfer line burner. Even the best chromium-nickel alloys are not suitable above about 1950° F. for continuous use even on pure gases. They are even less suitable, and are subject to rapid and severe erosion, at high temperatures when used with gases containing large quantities of hard erosive entrained solids. It is absolutely essential therefore to line cyclones for such high temperature use with refractory materials such as alumina, alumina-silica, zirconia, magnesia, beryllia, silicon carbide, carbon etc.

Refractory materials have been used satisfactorily to line the interior of the main body of cyclones as well as the gas-solids inlet line and the solids outlet line along with the inside surfaces of the cyclone top. The metal walls in these areas are only subjected to minimal heat since they are insulated from the process gases and solids on the inside by refractory and the other side is exposed generally to the atmosphere. Thus, heat can be removed from the metal exterior as fast as it is added from the interior of the cyclone.

The gas outlet tube from the cyclone, however, cannot be protected merely by coating it with refractory materials. The outlet tube extends downwardly in the cyclone, and both its inside and outside surfaces are subjected to high temperature gases and solids inside the cyclone. At equilibrium conditions, the metal, of course, eventually reaches the same temperature as the refractory and thus loses practically all of its strength. This results in failure of the outlet tube.

One proposed solution to the outlet tube design proper is disclosed in U.S. Patent No. 3,273,320. Therein is disclosed a tube made entirely of refractory material. While such tubes have certain advantages, it has been found that all-rafractory tubes are sensitive to shock and cracking and require special designs which can be expensive. In order to resist erosion inside the cyclone due to the presence of coke or other solids particles, it is necessary that the refractory material be of very high density. However, if it is made from high density materials, it is inherently sensitive to heat shock. Thus, the outlet tube disclosed in U.S. 3,273,320 is designed with slits positioned vertically through the refractory to minimize erratic unpredictable cracking asa result of heat shock. Such tubes, however, lack the strength of metallic tubes at lower temperatures and consequently, the all-refractory tubes require special support means located inside the cyclone. If it is attempted to extend an all-refractory outlet tube all the way through the top of the cyclone and solely support the tube by means of the cyclone top, the tube must be so long as to be highly susceptible to breakage due to its own extreme weight and the inherently poor tensile strength of refractories. On the other hand, if the tube is shortened by cutting it off at a point such that it does not extend down below the level of the gas-solids inlet, the gas-solids separation efficiency drops severly.

Still another improved cyclone design is disclosed in copending application Ser. No. 363,795 by Fred H. Guber et al., now patent No. 3,327,456. Therein is disclosed a refractory coated hollow cyclone outlet pipe or tube which is structured principally from concentric high alloy steel tubes having an annular space between them. The annular space is divided into sections by longitudinal baffles some of which stop short of the bottom of the tube and thereby provide a number of parallel vertical passages or paths through which a cooling fluid may be passed. Flow of the fluid is generally axial, i.e., the fluid flows down for the full length of one of vertical paths and back up through an adjacent vertical path to exit at the same end of the tube at which it entered.

The hollow refractory coated outlet tube of patent No. 3,327,456 is a substantial improvement over prior art outlet tubes. It is effective in keeping the alloy steel metal tubes relatively cool so that they retain their strength for supporting the refractory. However, certain difficulties have been encountered with the design. For example, when cooler incoming steam or other coolant enters one of the compartments in the hollow outlet tube at the top, it tends to cool the metal at that point to quite low temperatures. As the cooling fluid passes downwardly through the compartment, around the end of the baffle, and back upwardly through an adjacent compartment, it is heated to higher and higher temperatures. This results in the top of the adjacent compartment, where the cooling fluid exits, being at a much higher temperature than the equivalent point at the top of the compartment where the fluid entered. The result is that the outlet tube is subjected to quite severe stresses and strains due to the sharp and sudden variations in temperature at adjacent points around the circumference of the tube. This distorts the tube and can cause cracking of the refractory. It also puts a severt strain on the supporting members, e.g., flanges, etc. Also, because the hollow outlet tube consists of two metal tubes along with refractory coatings on each, it is substantially heavier than conventional metal tubes. Consequently, it is necessary generally to support it internally inside the cyclone. Otherwise the tube may tend to break under its own weight at high temperatures.

It is an object of this invention to provide a cyclone which can support an outlet tube which would be too heavy for conventional cyclones when supported solely from the top of the cyclone.

It is another object of this invention to provide a fluid-cooled outlet tube which is not subject to abrupt temperature gradients due to the effect of the coolant on the tube walls.

Still another object is top rovide an outlet tube having refractory shielding with very high resistance to fracture or heat shock.

These and other objects can be accomplished in accordance with the present invention which contemplates an improved cyclone separator having special design features which make it especially adaptable for high temperature use.

A unique feature of the present invention involves a cyclone top which is shaped convex downwardly. The downward shape can comprise a slightly depressed form or a sharply curved downwardly pointed form depending upon the strength required and the available space within the cyclone shell or main body. The top can extend downwardly to any extent desired, provided it does not excessively obstruct the flow of the incoming gas-solids suspension. Preferably, the lowest point on the inside surface of the cyclone top should not extend below the level of the top of the solids-laden gas inlet. Generally however, acceptable operations can be achieved even if the top extends below part or all of the inlet provided that the cross-sectional area in the line of flow from the inlet into the cyclone between the descending top and outlet tube combination and the adjacent cyclone wall is not significantly less than the cross-sectional area of the inlet line itself. In other words, as long as the convex downwardly shaped top and outlet tube together do not force the incoming gas-solids suspension to be compressed or abruptly diverted in direction of flow, excellent operations can be achieved.

A most significant advantage of a convex downwardly shaped top is that it approaches the strength of a convex upwardly shaped top. It is much stronger than a flat top and can therefore support much heavier outlet tubes. This strength feature is especially important in high temperature operations where it is necessary to support tubes with heavy loads of refractory. Even more important, in some cases, is the fact that the outlet tube can be greatly shortened if it is used in conjunction with a convex downwardly shaped top since the tube needs to extend only from the top down to a point slightly below the bottom of the gas-solids inlet. Thus, this invention makes it feasible to use outlet tubes which are coated more heavily with refractory than heretofore possible. The use of heavy coatings is feasible because short tubes can be used and because the strength of the convex downwardly shaped top is great.

Another unique feature which finds especially advantageous use in accordance with this invention is a tri-annular fluid-cooled refractory coated outlet tube. Such a tube employs three concentric passages or annular spaces, which are formed from four concentric metal tubes, to allow for the flow of cooling fluid when the cyclone is used at high temperatures. The innermost and outermost metal tube surfaces are covered with high temperature refractory to protect the metal from high temperature gases and solids inside the cyclone.

While the novel triannular outlet tube can be used in conventional cyclone structures, it is particularly advantageous to use it in combination with the convex downwardly shaped top of this invention since it is especially desirable to keep the outlet tube as short as possible in view of its great weight which results from the four concentric metal tubes, refractory and cooling fluid.

The triannular cyclone outlet tube is provided with inlet means for introducing fluid coolant such as steam downwardly through both the innermost and outermost of the three annular spaces. Outlet means are also provided for withdrawing coolant from the top of the intermediate annular space. The inlet and outlet means can consist of single fluid feed lines or pipes; preferably, however, they consist of multiple inlet and outlet lines spaced circumferentially around the top of the gas outlet tube to provide fluid flow which is uniform around the annular spaces.

In high temperature coking operations, the gas outlet tube is subjected to the bombardment of hard dense coke particles. Therefore, it is necessary that the refractory be of high density to resist erosion. If, however, the refractory is of high density it is sensitive to thermal shock. Therefore, it is especially preferable that the refractory shielding consist of segments or bricks sufficiently small in size to withstand the temperature shock and physical strains encountered, e.g., during the initial heatup of the cyclones.

For most conventional refractories the segments or bricks should be no thicker at the smaller dimension than about 3 inches, preferably about 2 inches, when the cyclone operating temperatures are to be in the range of about 1800° F. to 3000° F. The segments or bricks should be preferably be supported or attached to the metal walls of the tubes in a manner which leaves them free to expand or move slightly to submit to internal strains or external forces without cracking. An excellent method of support is to provide on the bottom of each brick a groove or recess designed to fit a projecting support member attached to and extending from the metal wall which is to be shielded.

Figure 4:
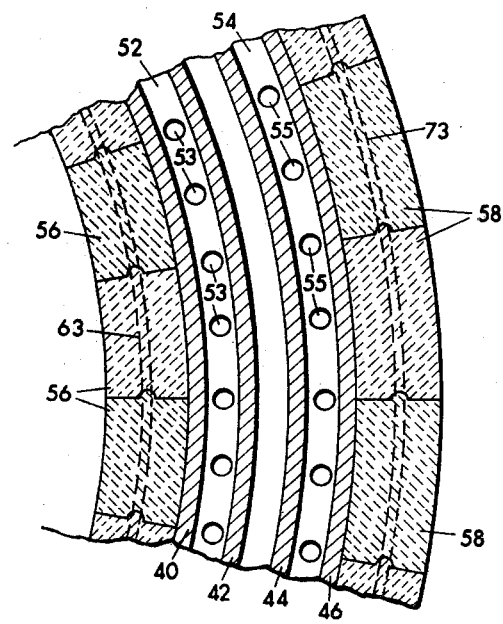
Figure 3:
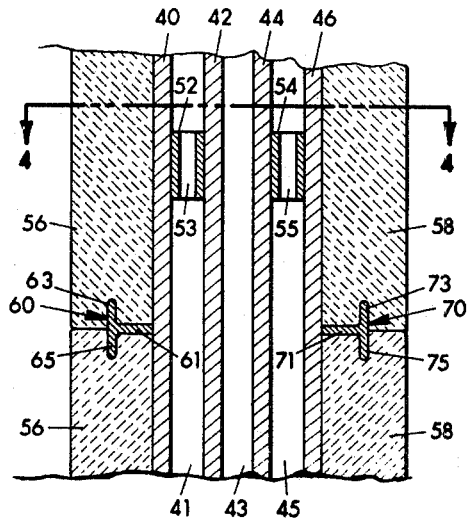
Figure 2:
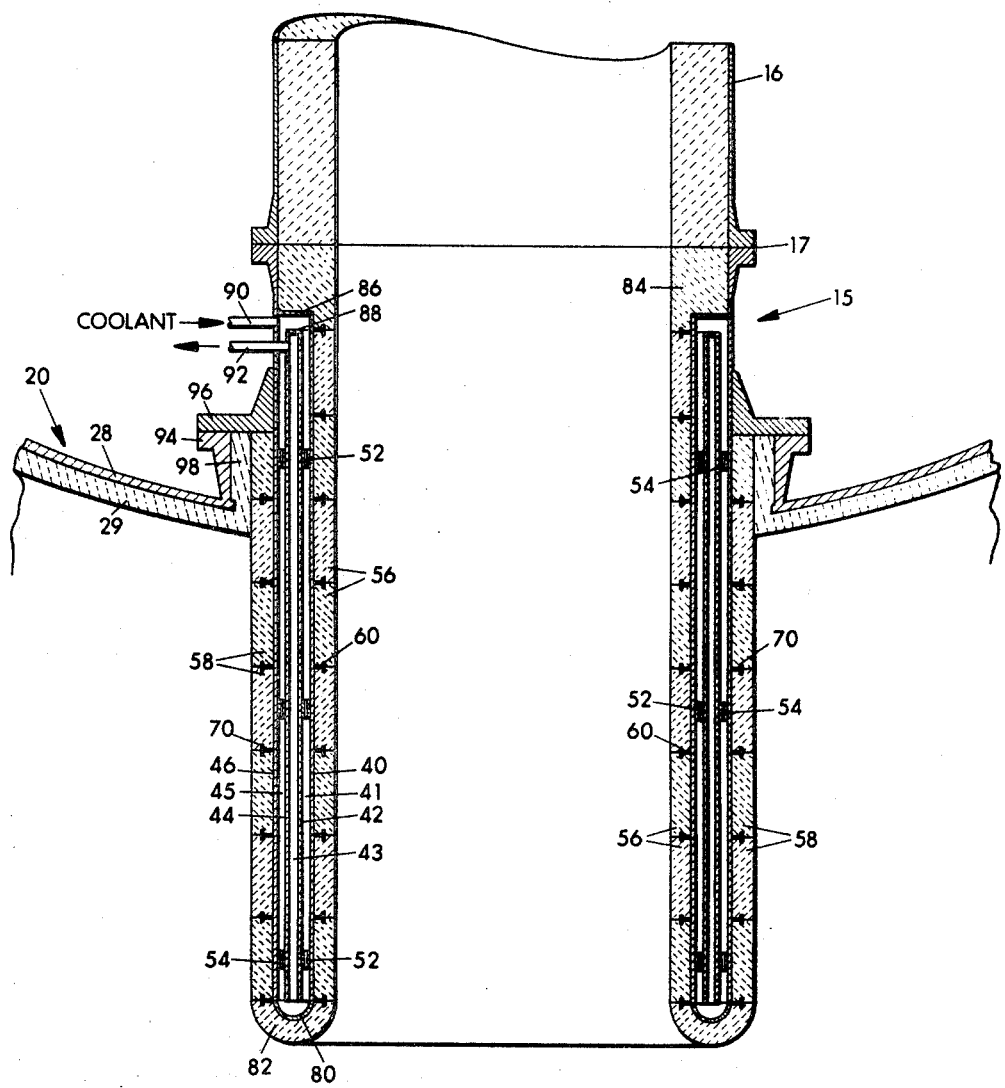

A better understanding of the invention will be achieved by reference to the drawings in which:

FIGURE 1 shows a longitudinal cross section of a cyclone separator having a convex downwardly shaped top in accordance with this invention, FIGURE 2 shows an enlarged partially cut away cross section of a portion of the convex downwardly shaped top and the triannular outlet tube of this invention, FIGURE 3 illustrates a detailed cross section of a portion of the triannular outlet tube showing the refractory and refractory support means, and FIGURE 4 shows a cross sectional view taken along line 4—4 of FIGURE 3.

Referring specifically to FIGURE 1 there is shown a cyclone 10 having a solids-gas inlet line 12, a solids outlet 13 and a gas outlet line 15. The gas outlet line 15 is connected to conduit 16 by means of flange 17. The lower portion of the cyclone 10 is conical and comprises a bottom metal shell 22 lined with an interior refractory lining 23. The main body of the cyclone is a cylindrical shell 24 lined with an interior refractory lining 25.

Inlet line 12 is composed of a metal tube 26 lined with a refractory lining 27.

Reference character 20 designates a convex downwardly shaped or dished top which is composed of a metal outer top 28 and an inner refractory lining 29.

Referring to FIGURE 2 there is shown a partially cutaway across section of the dished or convex downwardly shaped cyclone top in combination with a triannular gas outlet tube. Referring to the gas outlet tube, reference character 40 designates an innermost metal tube. Immediately adjacent tube 40 is an annular space 41 separating tube 40 from a second metal tube 42. An intermediate annular space 43 separates the second metal tube 42 from still a larger concentric metal tube 44. An outermost annular space 45 separates the third metal tube 44 from the outermost metal tube 46. Inner spacer rings 52 and outer spacer rings 54 maintain the distance between tubes which provide for the innermost and outermost annular spaces. The spacer rings are located at intervals along the length of the annular spaces. Similar spacers (not shown) are provided between tubes 42 and 44 to maintain the distance between the tubes to provide for annular space 43.

Reference characters 56 and 58 refer to inner and outer shield bricks or segments, respectively. The bricks can be composed of conventional refractories such as alumina, magnesia, beryllia, zirconia, silicon carbide, etc., depending on the atmosphere and the temperature to which they are to be exposed. The inner and outer shield bricks or segments are mounted on inner T-bar support ring 60 and outer T-bar support ring 70, respectively. The T-bar support rings will be described in more detail hereinafter.

A circular metal enclosing trough 80 connects the annular spaces at the bottom of the cyclone gas outlet tube. The enclosing trough is protected or shielded by a refractory coating 82.

A refractory liner 84 protects the inside of the flange 17 at the top of the gas outlet tube.

A cover plate ring 86 seals the space between metal tubes 40 and 46 to make a common inlet coolant space to feed coolant to the innermost and outermost annular spaces 41 and 45.

Similarly, a cover plate ring 88 seals the top of the intermediate annular space 43 to separate it from the innermost and outermost spaces. The cover plate rings are in gas sealing connection with the metal tubes, as by welding. Reference characters 90 and 92 indicate a cooling fluid inlet and outlet, respectively. Preferably a plurality of inlets and outlets are provided, spaced circumferentially around the outlet tube and then joined by common manifolds to supply and exhaust coolant lines (not shown).

A flange section 94 is centrally connected, as by welding, to metal outer top 28 of the convex downwardly shaped head 20. A matching upper flange section 96 is welded to the outermost metal tube 46 to support the tube, in conjunction with the lower flange section 94. A refractory liner 98 is provided between flange 94 and the refractory bricks or segments 58 of the gas outlet tube 15.

Referring specifically to FIGURES 3 and 4, an enlarged portion of the cross section of the outlet tube is shown. Reference characters 40, 42, 44 and 46 indicate the concentric metal tubes separated by annular spaces 41, 43 and 45. Inner spacer ring 52 and outer spacer ring 54 are shown separating tube 40 from tube 42 and tube 44 from tube 46, respectively. Inner T-bar support ring 60 and outer T-bar support ring 70 are shown mated with grooves or recesses in adjacent refractory bricks 56 and 58. The inner support rings consist of flat ring plates or ribs 61 with an upwardly protruding cylinder 63 and a downwardly protruding cylinder 65 which fit into corresponding grooves in the refractory bricks 56 above and below. Similarly, the outer T-bar support rings consist of flat ring plates or ribs 71 and upwardly protruding cylinders 73 and downwardly protruding cylinders 75.

FIGURE 4 shows a view across section 4—4 of FIGURE 3 and illustrates the circumferential relationship of adjacent inner bricks 56 and outer bricks 58. It also shows the radial relationship of the various metal tubes and annular spaces. Inner spacer ring 52 is shown with multiple holes 53 drilled through for passage of cooling fluid. As many holes as possible are used consistent with the strength requirements of the ring. Similarly outer spacer ring 54 is shown with multiple holes 55.

In operation coolant fluid such as steam is introduced into inlet 90 and passes downwardly through the innermost and outermost annular spaces 41 and 45 and then reverses direction at the bottom of the tube and passes up through intermediate annular space 43 and out of the annular space via coolant outlet 92. Thus the coolest available fluid is always in contact with the hottest metal tubes, that is, the innermost and the outermost tubes, while the hot or heated contacts only the tubes comprising the intermediate annular space. This provides for most effective use of the coolant and minimizes stresses and strains in the flanges and refractory bricks or segments.

In a specific example a high temperature cyclone having a structure designed in accordance with this invention is built with both a dished or convex downwardly shaped top and a tri-annular gas outlet tube. The main cyclone shell 24 is composed of rolled carbon steel 0.75 inch thick and lined with conventional alumina refractory 25. The main shell is 9.0 feet tall. The tapered bottom of the cyclone is rolled of carbon steel plate and is 0.75 inch thick and 16.0 feet tall. The cone is also lined with alumina refractory. The outlet opening 13 is 37 inches in diameter. Inlet 12 is rectangular in cross section and at the point of tangential entry into the main body of the cyclone it is 43 inches tall and 45 inches wide. It is composed of carbon steel plate and lined with alumina refractory.

Dished top 20 has a spherical dish shape having a radius of 100 inches and can be prepared by conventional rolling of carbon steel plate with an annular type 316 stainless steel stub attacher to receive the outlet flange. The inner lining 29 of the top is also alumina refractory.

In FIGURE 2 the refractory bricks 56 and 58 are composed of fired high purity alumina and are each 9 inches tall by 2½ inches thick and 4 inches wide. They are grooved at the top and bottom with grooves 1 inch deep to fit the T-bar support rings. Outermost tube 46 is composed of type 316 stainless steel and is ⅜ inch thick. The annular space 45 is ½ inch wide. The tube 44 is composed of ¼ inch type 304 stainless steel plate, as is tube 42. Annular space 43 between tubes 42 and 44 is 1 inch wide. The innermost tube 40 is ⅜ inch type 316 stainless steel and is separated from tube 42 by annular space 41 which is ½ inch wide.

The inner and outer T-bar support rings are composed of type 304 stainless steel. The rib portions 61 and 71 are about 1½ inches measured radially from the tubes to which they are attached (46 and 40, respectively). The rings are welded about the circumference of the tubes.

The inner and outer spacer rings 52 and 54 are ½ inch wide and are drilled with holes ¼ inch in diameter at intervals about 1.2 inches apart around the circumference of the rings. The spacer rings are cut from ¾ inch type 304 stainless steel plate. Cover plate rings 86 and 88 are also stamped from ¾ inch type 304 stainless steel plate. The innermost tube 40 is 26 inches in diameter and the open space through the tube is 21 inches in diameter when the refractory bricks are in place.

Inlet and outlet coolant lins 90 and 92 consist of 1½ inch Schedule 40 pipe. Six of each are provided at intervals around the circumference of the tube. The distance between plates 86 and 88 is 3⅜ inches. Flanges 94 and 96 are standard 150 pound large O.D. type 316 stainless steel flanges.

The total height of the tube from cover plate ring 86 to the bottom of refractory coating 82 on the circular metal enclosing trough 80 is 85 inches.

The above described cyclone is used in a high temperature coking process to separate coke particles from high temperature gases consisting mainly of hydrogen and light hydrocarbons. The solids-laden gases are introduced into inlet 12 of the cyclone at the rate of about 9000 moles per hour and are loaded with solid coke particles to the extent of about 200 pounds per mole of gas. The particles are in the size range from about 80 to 180 microns averaging about 120 microns and have a particle density of about 118 pounds per cubic foot. The pressure inside the cyclone is about 100 p.s.i.g.

The solids-laden gases enter tangentially and the solids are separated by centrifugal forces and pass out through the bottom of the cyclone at outlet 13. The gases, which are at about 2200° F., pass out through the gas outlet tube 15. The separation efficiency of solids removal from the gases is about 99.85%.

Approximately, 11,000 lbs. per hour of cooling steam at about 350° F. is introduced into linet lines 90 and passed downwardly through the innermost and outermost annular spaces of the gas outlet tube. The steam is introduced at a pressure of about 110 p.s.i.g. and passes downwardly through the innermost and outermost annular spaces and then back upwardly through the intermediate annular space 43 and out through outlets 92 at a pressure of about 104 p.s.i.g. and a temperature of about 600° F.

Temperature measurements indicate that while the outside surfaces of the refractory bricks 56 and 58 are at temperatures of about 2200° F., the innermost and outermost metal tubes 40 and 46 are kept at temperatures ranging from about 900° F. to about 1200° F., and there is essentially no indication at all of weakening or failure of any of the metal tubes.

What is claimed is:
1. A fluid cooled cyclone outlet tube suitable for use in a cyclone separator in contact with solids-laden gases at temperatures above about 2000° F. comprising four concentric metallic tubes whose diameters are sized to provide three concentric annular spaces for fluid flow between the tube walls, refractory material shielding the inside surfaces of the innermost tube and the outside surfaces of the outermost tube, inlet means for cooling fluid at the top of the innermost and outermost annular spaces, outlet means for cooling fluid at the top of the intermediate annular space, and means connecting the bottom of the innermost and outermost annular spaces adapted for fluid flow therebetween.

2. The outlet tube of claim 6 wherein said refractory material comprises refractory bricks and including support means for the bricks comprising metallic rings connected to the inside surface of the innermost tube and metallic rings connected to the outer surface of the outermost tube, said inside and outside rings having upward protrusions adapted to support the refractory bricks, and said bricks having recesses adapted to fit the protrusions of the inside and outside rings, respectively.

3. A cyclone separator comprising a generally cylindrical vertical shell having a tangential inlet for solids-laden gases, a solids outet at the lower end of the shell, a top shaped convex downwardly capping the shell;

a gas outlet generally centrally located in the top, said gas outlet including an outlet tube which extends downwardly below the level of the tangential inlet and which comprises four concentric metallic tubes in spaced apart relation to provide three concentric annular spaces for fluid flow, cooling fluid inlet means at the top of the innermost and outermost annular spaces, cooling fluid outlet means at the top of the intermediate annular space, and conduit means adapted for passage of cooling fluid from the bottom of the innermost and outermost annular spaces to the bottom of the intermediate annular space;

and refractory linings covering the inside surfaces of the shell and said inlet and outlet exposed to said solids-laden gases.

References Cited

UNITED STATES PATENTS

| | | | |
|---|---|---|---|
| 631,571 | 8/1899 | Hayden | 210—512 |
| 684,299 | 10/1901 | Olsen. | |
| 786,707 | 4/1905 | Zenner. | |
| 1,761,627 | 6/1930 | Hine | 55—459 X |
| 2,616,563 | 11/1952 | Hebb | 55—459 X |
| 3,273,320 | 9/1966 | Delaune et al. | 55—435 X |

HARRY B. THORNTON, Primary Examiner

U.S. Cl. X.R.

55—459